(12) United States Patent
Lee

(10) Patent No.: US 12,096,535 B2
(45) Date of Patent: Sep. 17, 2024

(54) INTEGRATED SMART SENSOR DEVICE

(71) Applicant: ECOLANT CO., LTD, Seoul (KR)

(72) Inventor: Hyea Geun Lee, Seoul (KR)

(73) Assignee: Ecolant Co., Ltd, Seoul (KR)

( * ) Notice: Subject to any disclaimer, the term of this patent is extended or adjusted under 35 U.S.C. 154(b) by 0 days.

(21) Appl. No.: 18/559,282

(22) PCT Filed: Apr. 27, 2023

(86) PCT No.: PCT/KR2023/005748
§ 371 (c)(1),
(2) Date: Nov. 6, 2023

(87) PCT Pub. No.: WO2023/211178
PCT Pub. Date: Nov. 2, 2023

(65) Prior Publication Data
US 2024/0251494 A1    Jul. 25, 2024

(30) Foreign Application Priority Data
Apr. 29, 2022 (KR) .......... 10-2022-0053618

(51) Int. Cl.
*H05B 47/13* (2020.01)
*F21V 23/04* (2006.01)
(Continued)

(52) U.S. Cl.
CPC ......... *H05B 47/13* (2020.01); *F21V 23/0471* (2013.01); *H05B 47/12* (2020.01); *F21W 2131/103* (2013.01)

(58) Field of Classification Search
CPC ...... H05B 47/13; H05B 47/12; H05B 47/115; H05B 47/105; H05B 47/10;
(Continued)

(56) References Cited

U.S. PATENT DOCUMENTS 9,711,018 B2 * 7/2017 Messiou ............... G01J 1/0411
2013/0308207 A1   11/2013 Hu et al.
(Continued)

FOREIGN PATENT DOCUMENTS

JP         2019083360 A    5/2019
KR    20-2007-0000492 U   4/2007
(Continued)

OTHER PUBLICATIONS

International Search Report, International Patent Application No. PCT/KR2023/005748, Aug. 7, 2023, 5 pgs.
(Continued)

*Primary Examiner* — Bao Q Truong
(74) *Attorney, Agent, or Firm* — Heidi Eisenhut; LOZA & LOZA, LLP

(57) ABSTRACT

An integrated smart sensor device, which is installed on one of a fixing pole standing on a ground or a bottom surface of facility, a fixing arm extending from the fixing pole in a horizontal direction, or a lighting device installed on the fixing arm and in which a plurality of sensors are installed, according to an embodiment of the present invention includes: a base; a main substrate which is disposed on one surface of the base and on which a plurality of electric components are mounted; a sensor substrate disposed on one surface of the main substrate; an infrared sensor assembly mounted on the sensor substrate and including a plurality of infrared sensors configured to detect movement of an object; a housing coupled to an edge of the base to accommodate the main substrate and the sensor substrate; a lens cover coupled to one side of the housing and having a hemispherical shape in which a plurality of lens arrays are provided; and a hemispherical divider disposed between the lens cover and the infrared sensor assembly so that infrared rays passing (Continued)

through the plurality of lens arrays are focused to be divided to the plurality of infrared sensors.

18 Claims, 9 Drawing Sheets

(51) Int. Cl.
*H05B 47/12* (2020.01)
*F21W 131/103* (2006.01)

(58) Field of Classification Search
CPC ............ F21V 23/0471; F21V 23/0442; F21W 2131/103; F21W 2131/10
See application file for complete search history.

(56) References Cited

U.S. PATENT DOCUMENTS

| | | | |
|---|---|---|---|
| 2014/0103214 A1 | 4/2014 | Messiou et al. | |
| 2014/0104831 A1* | 4/2014 | Beausoleil | F21V 23/02 362/249.02 |
| 2019/0056536 A1 | 2/2019 | Buckley | |
| 2019/0130711 A1 | 5/2019 | Terada et al. | |
| 2020/0337141 A1* | 10/2020 | Hong | H04W 4/80 |
| 2021/0156736 A1 | 5/2021 | Hu | |

FOREIGN PATENT DOCUMENTS

| | | |
|---|---|---|
| KR | 10-1455748 B1 | 11/2014 |
| KR | 10-2015-0134802 A | 12/2015 |
| KR | 10-1632198 B1 | 7/2016 |
| KR | 10-2019-0024239 A | 3/2019 |
| KR | 10-2020-0018938 A | 2/2020 |
| KR | 10-2020-0086784 A | 7/2020 |
| KR | 10-2021-0007729 A | 1/2021 |

OTHER PUBLICATIONS

International Written Opinion, International Patent Application No. PCT/KR2023/005748, Aug. 7, 2023, 7 pgs.

* cited by examiner

INTEGRATED SMART SENSOR DEVICE

TECHNICAL FIELD

The present invention relates to an integrated smart sensor device in which a motion sensor, a noise sensor, an optical sensor, a vibration sensor, and a positioning sensor are integrated based on an interface that is interoperable and compatible with heterogeneous devices.

Particularly, the present invention relates to an integrated smart sensor system in which movement of a vehicle or human is detected through a motion sensor using an integrated smart sensor and a sensing algorithm, surrounding noise is detected through a noise sensor, an amount of surrounding light is detected through an optical sensor, and an impact (or inclination, earthquake, vibration) of a pole is detected through a vibration sensor (or accelerometer) and which is backend interface interlocked with heterogeneous devices attached to streetlight poles, multi device-mounted poles, or smart poles, is interlocked with other integrated smart sensors through ZigBee or Bluetooth communication, and is networked with a control system through data interlocking with an external smartphone or vehicle and Internet of things communication (M2M).

BACKGROUND ART

In the related art, road lighting remote control systems individually uses a one-way flasher, a two-way flasher, an illuminance sensor, or a motion sensor to control turn on/off or brightness of road lights by utilizing a wired or wireless communication system.

However, as in the related art, there is a limitation in expandability due to a simple dimming function and an operation status because of an independent operation with no interlocking function with heterogeneous devices attached to the streetlights or streetlight poles on the road.

In addition, the streetlights according to the related art are causing civil complaints in surrounding residential areas and buildings due to sensor detection errors or unnecessary dimming operations due to vibration of streetlight poles.

In addition, sensors installed in the typical streetlights have a sensor detection range of about 50 degrees in front of the sensor and thus have difficulties in energy saving and optimization due to poor detection performance and a minimized dimming range.

Thus, functions that are capable of securing functional expandability through the communication with the heterogeneous devices and interoperability, compatibility, acceptability, and expandability through application of data-based API are required, and the sensor detection range is expanded to secure road safety and save energy.

In addition, it is possible to identify and report overload, temperature rise, or error conditions due to abnormal current of a lighting device, and function of a control device that is capable of identifying and solving the problems through real-time precise status analysis and preliminary inspection of main components of the lighting devices such as LEDs, converters, communication, power, and control devices is required.

In addition, needs for immediate response functions to emergencies that may occur on the road are increasing to manage safety of facilities due to an impact of the light pole, detect earthquakes or ground shaking, establish new data by collecting noise generation around the road, and increase in space safety through connection with personal smart devices or emergency vehicles.

DISCLOSURE OF THE INVENTION

Technical Problem

The present invention is intended to solve the above-described problems, and an object of the present invention is to provide an integrated smart sensor device that is capable of detecting movement of vehicles or people by expanding a sensor detection range to secure safety.

In addition, an object of the present invention is to provide an integrated smart sensor device that is capable of detecting surrounding situations without a separate additional device by using a heterogeneous device interface and an integrated sensor to directly transmit data to a control system.

In addition, an object of the present invention is to provide an integrated smart sensor that is networked in real time with smartphones or emergency vehicles through Bluetooth communication or other communication methods, changes an operation of a streetlight in which an integrated smart sensor is installed when communicating with the smartphones or emergency vehicles, and shares information about a network connection status the smartphones or emergency vehicles.

In addition, an object of the present invention is to provide an integrated smart sensor that enables application of a Zigbee communication, sub-giga (Sub-1 GHZ), WiFi communication, or Bluetooth communication method as a communication method applied for an interlocking operation of each of a plurality of streetlights installed on the road so as to be selectively applied for demand and situation to a control program.

In addition, an object of the present invention is to provide an integrated smart sensor that is interlocked with a digital converter, which supplies driving power of a lighting device, to perform a real-time status analysis (overload, malfunction, inoperability, or failure) and preliminary inspection of an LED, a converter, a communication device, and a power supply, which are main components for an operation of the lighting device, and self-resolves occurring abnormal conditions.

In addition, an object of the present invention is to provide an integrated smart sensor that detects vibration or inclination of a streetlight at a certain angle due to streetlights that vibrate or are tilted at a certain angle due to foundation erosion of the streetlight, an external impact, earthquake, or surrounding sinkhole (porthole or sinkhole) and sends a warning to a control sensor, thereby enabling real-time monitoring of a streetlight facility and securing safety of the road.

In addition, an object of the present invention is to provide an integrated smart sensor that provides position-based information to enable a position-based management of a streetlight facility and detect a precise position when an abnormal situation occurs in safety.

In addition, an object of the present invention is to provide an integrated smart sensor that is capable of executing a lighting or operation of a light when a sudden dark situation occurs due to weather changes during day when the street light is normally turned off or due to sudden changes in surrounding circumstances (including events or changes in surrounding luminance).

Technical Solution

An integrated smart sensor device, which is installed on one of a fixing pole standing on a ground or a bottom surface of a facility, a fixing arm laterally extending from the fixing pole, or a lighting device installed on the fixing arm, and in which a plurality of sensors are installed, wherein the integrated smart sensor device comprises: a base; a main substrate which is disposed on one surface of the base and on which a plurality of electric components are mounted; a sensor substrate disposed on one surface of the main substrate; an infrared sensor assembly mounted on the sensor substrate and comprising a plurality of infrared sensors configured to detect movement of an object; a housing coupled to an edge of the base to accommodate the main substrate and the sensor substrate; a lens cover coupled to one side of the housing and having a hemispherical shape in which a plurality of lens arrays are provided; and a hemispherical divider disposed between the lens cover and the infrared sensor assembly so that infrared rays passing through the plurality of lens arrays are divided and focused to the plurality of infrared sensors.

The plurality of infrared sensors may include: a second infrared sensor; a first infrared sensor disposed at a left side of the second infrared sensor; and a third infrared sensor disposed at a right side of the second infrared sensor, wherein a line connecting centers of the first to third infrared sensors has a triangular shape, and each of the first to third infrared sensors is a passive infrared sensor.

A vertical surface extending along an edge of a road may be defined as a first vertical surface, a vertical surface passing through the second infrared sensor and orthogonal to the first vertical surface may be defined as a second vertical surface, a direction that is oriented from the edge of the rod in a central direction may be defined as a front direction, a zone on which the object is detected by the second infrared sensor and which is divided by the second vertical surface may be defined as a central detection zone, a zone on which the object is detected by the first infrared sensor and which is spaced apart from the central detection zone to a left side at a predetermined angle and is defined between the central detection zone and the first vertical surface may be defined as a left detection zone, a zone on which the object is detected by the third infrared sensor and which is spaced apart from the central detection zone to a right side at a predetermined angle and is defined between the central detection zone and the first vertical surface may be defined as a right detection zone, and detection surfaces of the first to third infrared sensors may be installed to be oriented in different directions so that the left detection zone, the central detection zone, and the right detection zone are detected by the first to third infrared sensors, respectively.

The central detection zone may include: a front detection zone defined in front of the first vertical surface and a rear detection zone defined behind the front detection zone.

The detection surface of the second infrared sensor may be oriented in a direction that is inclined at a predetermined angle directly downward and/or in front of the first vertical surface.

The detection surface of the first infrared sensor may be inclined at a predetermined angle ($\theta 1$) downward from the vertical surface passing through the sensor substrate to face the left detection zone and be inclined at a predetermined angle ($\theta 2$) from the first vertical surface toward the second vertical surface.

The detection surface of the third infrared sensor may be inclined at a predetermined angle ($\theta 1$) downward from the vertical surface passing through the sensor substrate to face the right detection zone and be inclined at a predetermined angle ($\theta 2$) from the first vertical surface toward the second vertical surface.

The divider may include: a first guide groove configured to guide the infrared rays emitted from the object disposed on the left detection zone to be focused to the first infrared sensor; a second guide groove configured to guide the infrared rays emitted from the object disposed on the central detection zone to be focused to the second infrared sensor; and a third guide groove configured to guide the infrared rays emitted from the object disposed on the right detection zone to be focused to the third infrared sensor, wherein the first to third guide grooves may be disposed to be spaced apart from each other in a circumferential direction of the divider.

A first sensor hole in which the detection surface of the first infrared sensor is disposed may be defined in a bottom of the first guide groove, a second sensor hole in which the detection surface of the second infrared sensor is disposed may be defined in a bottom of the second guide groove, a third sensor hole in which the detection surface of the third infrared sensor is disposed may be defined in a bottom of the third guide groove, and each of the first to third guide grooves may be recessed in a shape of which a width is gradually narrowed from an outer circumferential surface of the divider to the sensor hole.

A plurality of lens arrays may be disposed on a rear surface of the lens cover, and each of the plurality of lens arrays may be provided as an assembly of patterns of a plurality of Fresnel lenses.

The plurality of lens arrays may include: a first lens array configured to focus the infrared rays emitted from the object disposed on the left detection zone to the first infrared sensor; a second lens array configured to focus the infrared rays emitted from the object disposed on the central detection zone to the second infrared sensor; and a third lens array configured to focus the infrared rays emitted from the object disposed on the right detection zone to the third infrared sensor.

The patterns of the Fresnel lenses constituting the first and third lens arrays may be the same, and the Fresnel lens constituting the second lens array may have the pattern different from each of the patterns of the Fresnel lenses constituting the first and third lens arrays.

The second lens array may be an assembly of circular Fresnel lenses, and the first and third lens arrays may be provided in a symmetrical shape with respect to the second lens array and be an assembly of Fresnel lenses extending in a rectangular shape.

The second lens array may include: a front lens array configured to focus the infrared rays emitted from the object disposed on the front detection zone to the second infrared sensor; and a lower lens array configured to focus the infrared rays emitted from the object disposed on the lower detection zone to the second infrared sensor, wherein a diameter of the Fresnel lens constituting the front lens array may be greater than that of the Fresnel lens constituting the lower lens array.

The integrated smart sensor device may further include a sensor bracket configured to support the first to third infrared sensors, wherein the sensor bracket may include: a first mounting part on which a seating surface of the first infrared sensor is defined; a second mounting part on which a seating surface of the second infrared sensor is defined; and a third mounting part on which a seating surface of the third infrared sensor is defined, wherein one or a plurality of bracket fixing protrusions may protrude from a bottom surface of the sensor bracket.

A pair of sensor fixing hooks may extend from an edge of each of the seating surfaces of the first to third mounting parts, a sensor fixing hole may be defined in each of the seating surfaces, and the number of sensor fixing holes may be different for each mounting part.

The plurality of sensors may further include at least one of: a noise sensor configured to detect surrounding noise so as to generate noise information; a positioning sensor configured to generate positioning information related to an installed position of the fixing pole; an optical sensor configured to detect surrounding luminous flux, luminance, or illuminance so as to generate optical detection information; or a vibration sensor configured to detect an inclination or vibration of the fixing pole or the lighting device so as to generate inclination information or vibration information.

The integrated smart sensor device may further include: a communication unit configured to perform communication with at least one control server; and a control unit configured to acquire object type information based on object movement information so as to transmit the object movement information and the object type information to the control server through the communication unit.

The control unit may be configured to transmit at least one of the noise information, the positioning information, the optical detection information, the inclination information, or the vibration information to the at least one control server through the communication unit.

The integrated smart sensor device may be controlled in operation according to a control command transmitted from a control interface to the control unit, and the control interface may be provided in a control device that communicates with the control server in a wired or wireless manner.

Advantageous Effects

The integrated smart sensor according to the embodiment of the present invention may expand the sensor detection range to detect the movement of the vehicle or person, thereby securing the safety.

In addition, the integrated smart sensor according to the embodiment of the present invention may provide the interface that is capable of being interlocked with the heterogeneous devices and detecting the surrounding situation without the separate additional device by using the various integrated sensors to transmit/receive the data to/from the control system.

In addition, in the integrated smart sensor according to an embodiment of the present invention, the divider may be installed inside the sensor device, and thus, even though the multiple infrared detection sensors are installed close to each other, there may be no confusion in detection signals to miniaturize the size of the senor device.

MODE FOR CARRYING OUT THE INVENTION

Figure 1:
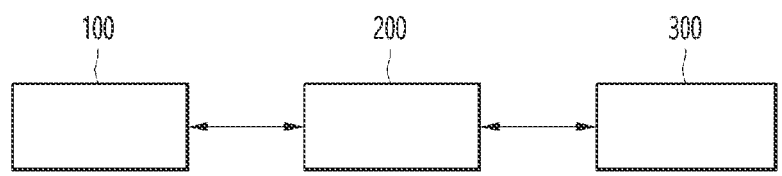
FIG. 1 is a block diagram for explaining an operation system of an integrated smart sensor device according to an embodiment of the present invention.

FIG. 1 is a block diagram for explaining an operation system of an integrated smart sensor device according to an embodiment of the present invention.

Referring to FIG. 1, an operation system 10 of an integrated smart sensor device according to an embodiment of the present invention may include at least one integrated smart sensor device 100, at least one control server 200, and at least one control device 300.

In detail, the integrated smart sensor device 100 may be attached to street lights, security lights, smart poles, traffic lights, or landscape lighting systems that are capable of being installed around roads or facilities to operate by being combined with ICT technologies such as communication devices (long-distance and short-distance communication), IoT, and the like.

The control server 200 may be a server that controls smart streetlights or smart poles. The control server 200 may transmit and receive information to/from the at least one integrated smart sensor device 100 and the at least one control device 300 in a wired or wireless manner.

The control device 300 may be a device that transmits and receives information to/from the control server 200 in the wired or wireless manner and is used by a manager who controls the smart streetlights or the smart poles. The control device 300 may provide a control interface that allows the control server 200 to check information generated from the at least one integrated smart sensor device 100 and controls the at least one integrated smart sensor device 100.

Figure 2:
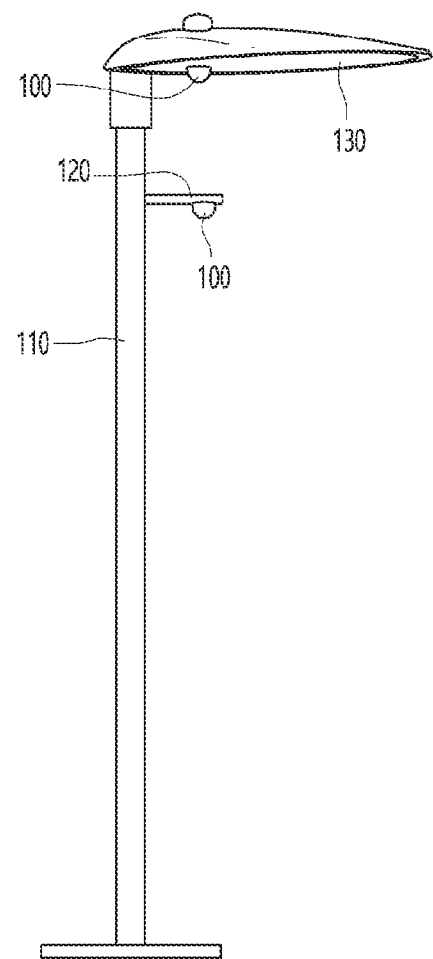
FIG. 2 is a view illustrating a position at which the integrated smart sensor device is attached according to an embodiment of the present invention.

FIG. 2 is a view illustrating a position at which the integrated smart sensor device is attached according to an embodiment of the present invention.

Referring to FIG. 2, the integrated smart sensor device 100 according to the present invention may be mounted on a fixing arm 120 extending from a fixing pole 110 or attached to a lighting device 130 mounted on the fixing pole 110 to operate.

In detail, the fixing pole 110 may be installed on the ground or a bottom of a facility to extend vertically upward by a predetermined length. The fixing pole 110 may be provided as a pipe having an empty interior, and a lower end of the fixing pole 110 may be fixed to the ground.

The fixing arm 120 may extend from the lower end of the fixing pole 110 by a predetermined length in a horizontal direction at a predetermined height.

The integrated smart sensor device 100 may detect movement of an object to generate movement information of the object or detect noise occurring around the integrated smart sensor device 100 to generate noise information.

In addition, the integrated smart sensor device 100 may measure an amount of surrounding light and generate vibration information by detecting an inclination and impact of the fixing pole 110.

The integrated smart sensor device 100 may transmit the object movement information, the noise information, the light amount information, and the vibration applied to the fixing pole 110 to other external heterogeneous devices or the control system and may control the lighting device 130 based on the object movement information, the light amount information, the vibration information, and the noise information, which are detected, or by applying and combining the pieces of information.

A height at which the integrated smart sensor 120 is installed may be 3 meters to 6 meters if the fixing pole 110 functions as the security light and may be 8 meters to 15 meters if the fixing pole 110 functions as the streetlight, but the installation height may be adjusted appropriately depending on installed positions or conditions.

The lighting device 130 may include a lighting that is capable of illuminating or controlling various dimming, tunable white, and color changing. For example, the lighting device 130 may include an LED light having RGBW colors and may include an LED light having various white color temperatures. In addition, the lighting device 130 may illuminate or control light by controlling the dimming, the tunable white, and the color changing according to a control command transmitted from the integrated smart sensor device 100.

The lighting device 130 may be fixed to an upper end of the fixing pole 110. The lighting device 130 may be electrically connected to the integrated smart sensor device 100 and may include an LED light capable of turning the light on/off, controlling brightness, controlling the color temperature, and adjusting the colors.

Figure 3:
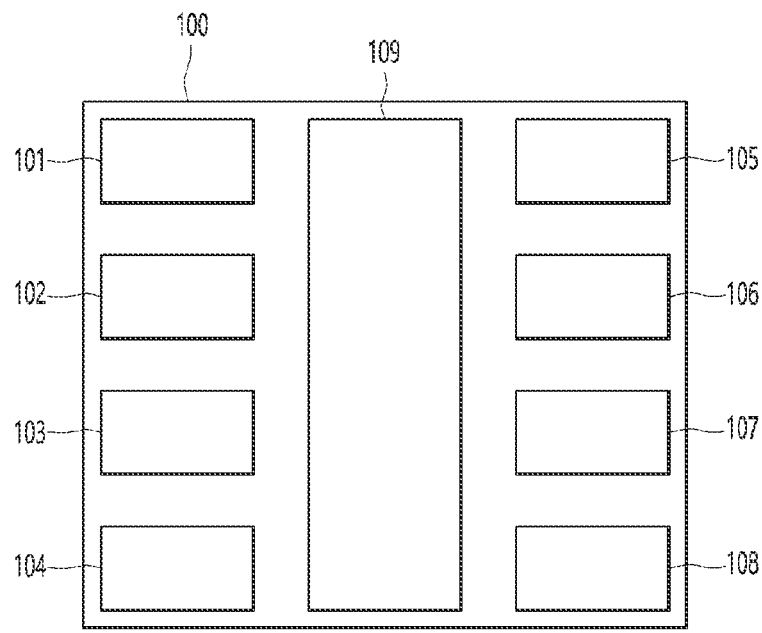
FIG. 3 is a block diagram for explaining a configuration of the integrated smart sensor device according to an embodiment of the present invention.

FIG. 3 is a block diagram for explaining a configuration of the integrated smart sensor device according to an embodiment of the present invention.

Referring to FIG. 3, the integrated smart sensor device 100 may include a communication unit 101, a motion sensor 102, a noise sensor 103, a power supply unit 104, a positioning sensor 105, and an output unit 106, a vibration sensor 107, an optical sensor 108, and a control unit 109.

In detail, the communication unit 101 may communicate with an external device in wired or wireless communication. The communication unit 121 may communicate directly with the control server 200, etc. using machine to machine (M2M) communication (e.g., LTE, 5G, NB-IOT, CAT1, CATm1, etc.) technology. In addition, the communication unit 101 may support short-distance communication using radio frequency (FR) communication (e.g., Bluetooth low energy (BLE), Wi-Fi: wireless-fidelity, sub-1 GHz or Zigbee, etc.) technology.

The motion sensor 102 may detect the movement of the object to generate the object movement information. For example, the motion sensor 102 may include at least one passive infrared sensor (PIR sensor).

The noise sensor 103 may detect surrounding noise to generate the noise information.

The power supply unit 104 may supply power throughout the integrated smart sensor device 100. The power supply unit 104 may include a converter that converts AC power to DC power and a DC/DC converter that converts a level of the DC power.

The positioning sensor 105 may generate the positioning information related to the position of the integrated smart sensor device 100 through precise position-based satellite positioning. The positioning sensor 105 may generate the positioning information using a global navigation satellite system (GNSS).

The output unit 106 may convert analog data into digital data to output the digital data. The output unit 106 may use digital conversion technologies such as PWM, DALI, DALI-2, D4i, DT6, DT7, and DT8 and also may use protocols 1-10V and 0-10V) for the analog converter.

The vibration sensor 107 may detect the inclination of the fixing pole 110, the fixed arm 120, or the lighting device 130 or may detect the vibration caused by the external impact, the sinkhole, or the earthquake to generate inclination information or vibration information.

The control unit 109 may transmit the inclination information and vibration information to the control server 200 through the communication unit 101.

The control server 200 may be a third party server set by the manager.

The optical sensor 108 may generate light detection information by detecting surrounding luminous flux, luminance, or illuminance. The control unit 109 may control the dimming, the tunable white, and the color changing of the lighting device 130 based on the light detection information.

In addition, the control unit 109 may transmit the light detection information to the control server 200. The light detection information may be transmitted to the control device 300 through the control server 200, and the manager of the control device 300 may remotely control the lighting device 130 based on the light detection information.

The control unit 109 may control components of the integrated smart sensor device 100 to perform set or determined operations.

The control unit 109 may control the components of the integrated smart sensor device 100 to execute a predicted operation or an operation determined to be desirable among at least one executable operation.

When interlocking with the external device is required to perform the determined operation, the control unit 109 may generate a control signal to control the corresponding external devices (e.g. a CCTV, an emergency button, a personal smart device, a vehicle, an environmental sensor, a fire sensor, an electric charging device, a drone, etc.) and may be interlocked with an applied programming interface (API) to transmit the generated control signal to the corresponding external device.

In addition, the control signal may be transmitted from the control unit 109 through the interlocking between the control signal and the interface software in the external device to change profiled processing and actions of the control unit 109.

The control unit 109 may control at least a portion of the components of the integrated smart sensor device 100 to run predetermined application program. Furthermore, the control unit 109 may operate two or more of the components provided in the integrated smart sensor device 100 in combination with each other to run the application program.

Figure 4:
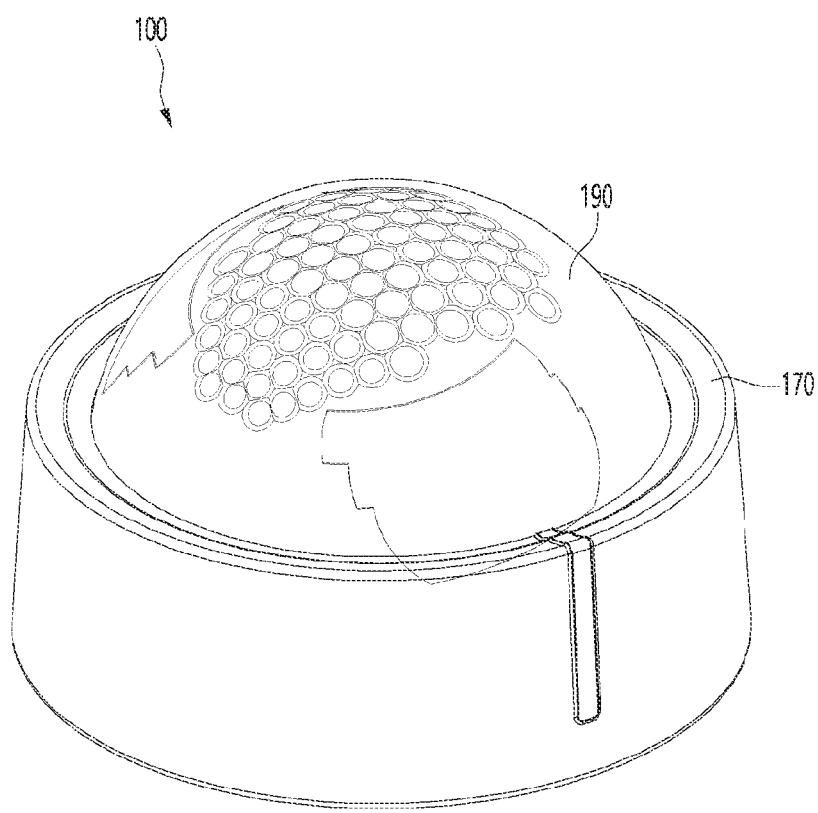
FIG. 4 is a perspective view of a smart sensor device according to an embodiment of the present invention.
Figure 5:
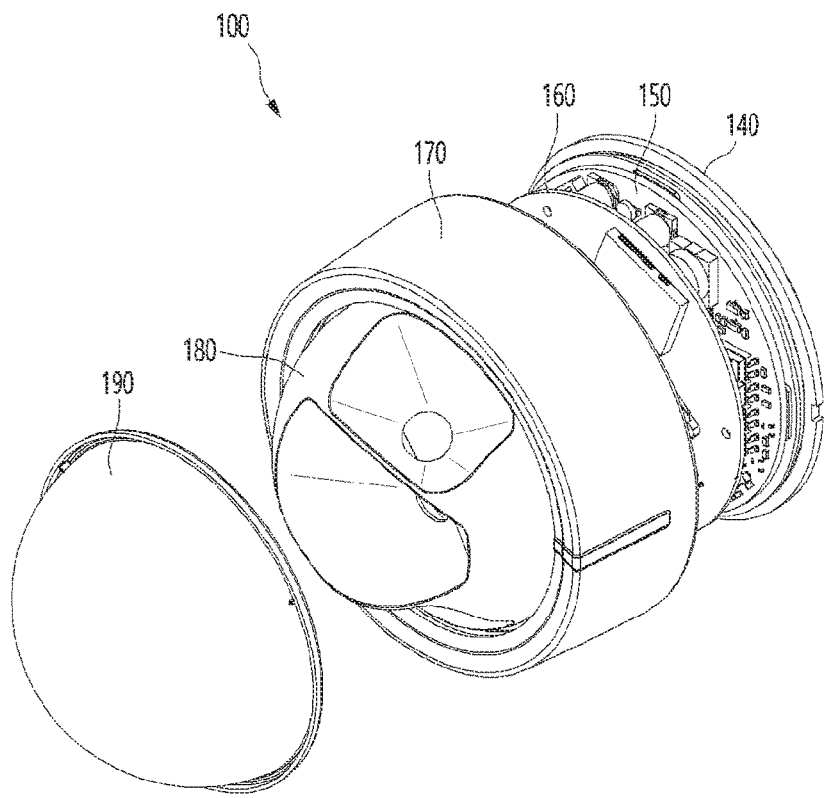
FIG. 5 is an exploded perspective view of the smart sensor device.
Figure 6:
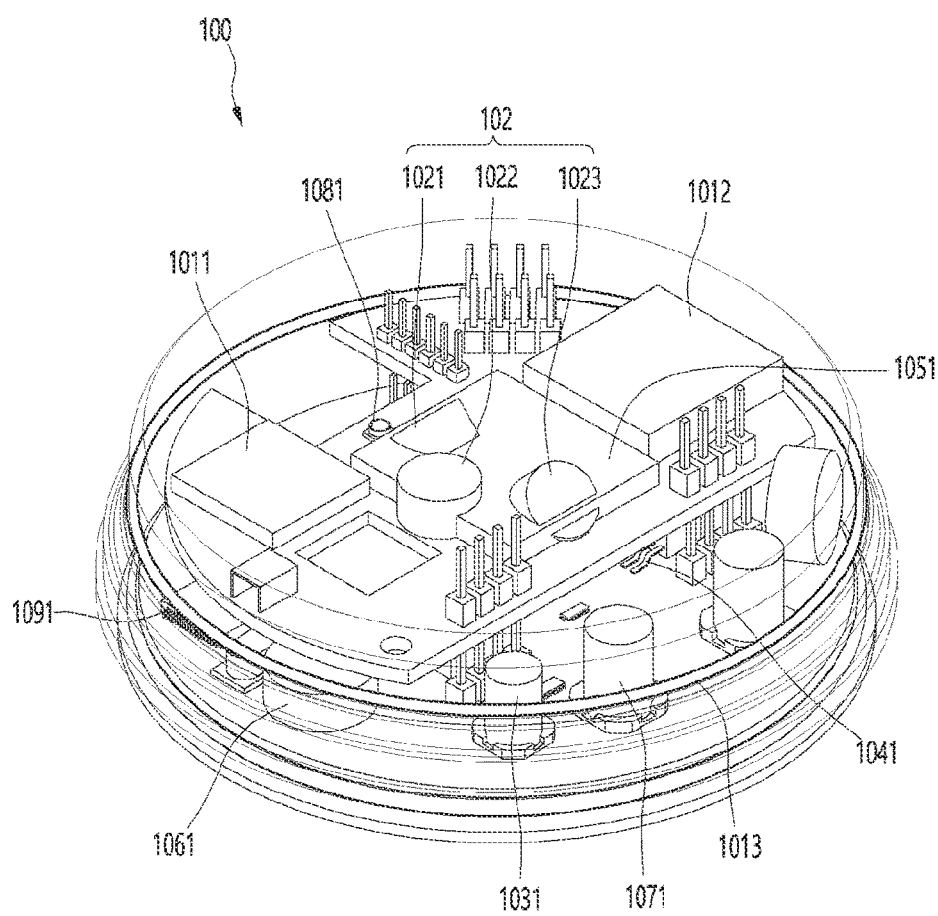
FIG. 6 is a perspective view illustrating an inner configuration of the smart sensor device.

FIG. 4 is a perspective view of the smart sensor device according to an embodiment of the present invention, FIG. 5 is an exploded perspective view of the smart sensor device, and FIG. 6 is a perspective view illustrating an inner configuration of the smart sensor device.

Referring to FIGS. 4 to 6, the smart sensor device 100 according to an embodiment of the present invention may include a cylindrical housing 170, a base 140 coupled to one end of the housing 170, a lens cover 190 coupled to the other end of the housing 170, a main substrate 150 disposed on a top surface of the base 140, a sensor substrate 160 disposed on a top surface of the main substrate 150, and a divider 180 disposed at an upper side of the sensor substrate 160.

In detail, the communication unit 101 of the integrated smart sensor device 100 according to an embodiment of the present invention may include an RF communication module 1011, an M2M communication module 1012, and a 4G ring antenna 1013. The RF communication module 1011 and the M2M communication module 1012 may be mounted on the sensor substrate 160, and the 4G ring antenna 1013 may be surrounded around an inner circumferential surface of the housing 170.

The motion sensor 102 may include a first infrared sensor 1021 (passive infrared sensor (PIR), a second infrared sensor 1022, and a third infrared sensor 1023. The first to third infrared sensors 1021 to 1023 may be mounted on the sensor substrate 160.

The noise sensor 103 may include a noise sensing module 1031, and the power supply unit 104 may include a power supply module 1041. The noise sensing module 1031 and the power supply module 1041 may be mounted on the main substrate 150.

The positioning sensor 105 may include a positioning sensing module 1051, the optical sensor 108 may include a light amount measurement (photosensor) module 1081, and the positioning sensing module 1051 and the light amount measurement module 1081 may be mounted on the sensor substrate 160.

The output unit 106 may include an analog/digital output module 1061, the vibration sensor 107 may include an accelerometer 1071, and the control unit 109 may include a microcontroller unit 1091 (MCU). The analog/digital output module 1061, the accelerometer 1071, and the microcontroller unit 1091 may be mounted on the main substrate 150.

When applying a digital protocol to the converter responsible for supplying and driving power to lighting device, the microcontroller unit 1091 may be provided with a control algorithm to report a real-time precise status of the main components for the lighting device operation, perform preliminary inspection, resolve abnormal conditions, and report the information to a control center.

Figure 7:
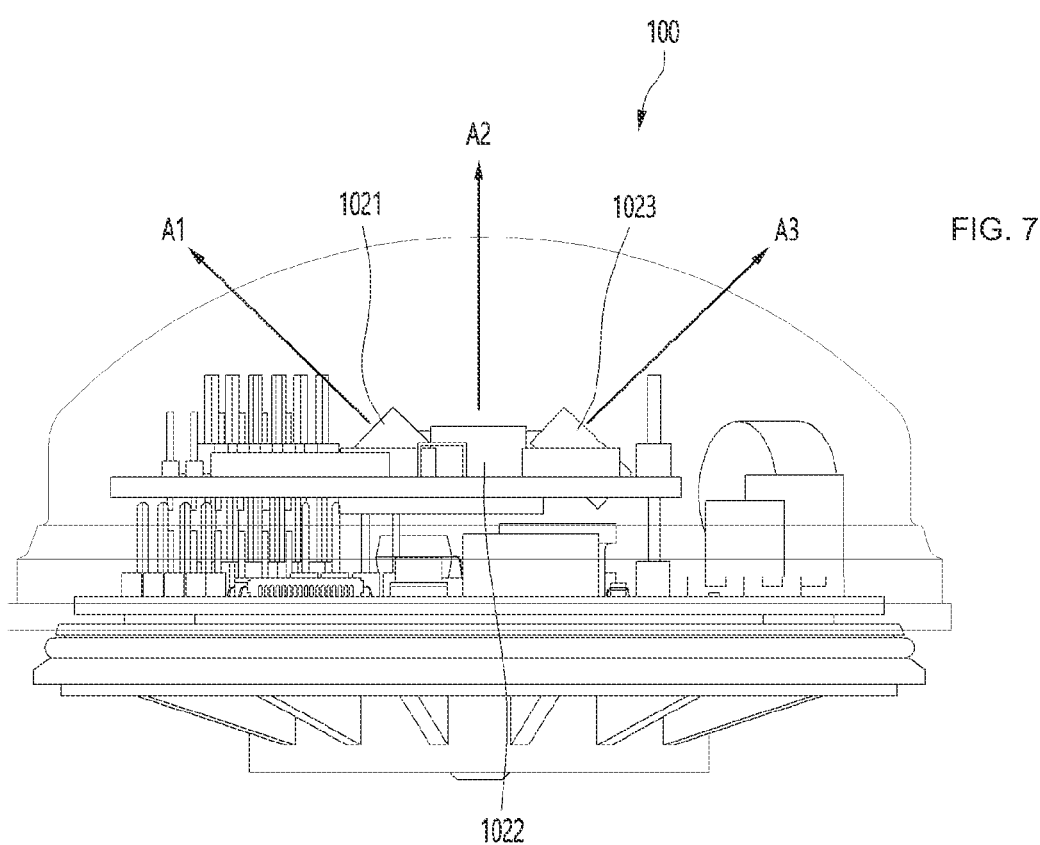
FIG. 7 is a side view of an integrated smart sensor from which a housing, a divider, and a lens cover are removed according to an embodiment of the present invention.

FIG. 7 is a side view of the integrated smart sensor from which the housing, the divider, and the lens cover are removed according to an embodiment of the present invention.

Referring to FIG. 7, when the integrated smart sensor device 100 is mounted on the streetlight, the lens cover 190 may face the ground, and thus, an arrow indicating a sensing direction in the drawing may be understood as facing the ground.

In detail, the first infrared sensor 1021, the second infrared sensor 1022, and the third infrared sensor 1023 may be installed facing different directions to detect different zones, respectively, but the detection zones may not overlap each other.

For example, a line connecting the installation positions of the first to third infrared sensors 1021, 1022, and 1023 may form a triangle based on the state in which the integrated smart sensor device 100 is installed on the fixed arm 120.

In detail, a second sensing direction A2 of the second infrared sensor 1022 may be a vertical direction (ground direction). Here, the vertical direction refers to a vertical direction when the sensor substrate 160 is in a horizontal state. That is, it is assumed that the ground on which the sensor substrate 160 and the fixing pole 110 are installed are parallel to each other. Alternatively, a central axis of the second infrared sensor 1022, that is, a direction, in which a polarizing filter corresponding to a window is directed, may be disposed to be inclined at a predetermined angle forward from the vertical line (direction toward a center of the road at the sidewalk). The inclination angle of the second infrared sensor 1022 may be 15 degrees or less. The window or polarizing filter may be defined as a detection surface of the infrared sensor.

In addition, the first sensing direction A1 of the first infrared sensor 1021 may be a direction that is inclined at a predetermined angle (for example, 45 degrees or less) in a first lateral direction (counterclockwise direction) from the second sensing direction A2. In other words, the sum of an angle θ1 defined between the sensor substrate 160 and the central axis of the first infrared sensor 1021 and an angle defined between the central axis of the first infrared sensor 1021 and the vertical plane is 90 degrees.

In addition, a third sensing direction A3 of the third infrared sensor 1023 may be a direction that is inclined at a predetermined angle (for example, about 45 degrees) in a second lateral direction (clockwise direction) from the second sensing direction A2. That is, the sum of an angle θ1 defined between the sensor substrate 160 and a central axis of the third infrared sensor 1023 and an angle defined between the central axis of the third infrared sensor 1023 and the vertical plane is 90 degrees.

In addition, the first to third infrared sensors 1021, 1022, and 1023 may be installed to be inclined at a predetermined angle θ2 (for example, 15 degrees or less) forward from the vertical direction (direction from a shoulder of the road toward the center line of the road). The angle θ2 may be understood as an angle defined between a straight line connecting the shoulder of the road and the central axis of the first infrared sensor 1021 and an angle defined between the straight line connecting the shoulder of the road and the central axis of the third infrared sensor 1023. Therefore, each of an angle defined between a central axis of the second infrared sensor 1022 and the central axis of the first infrared sensor 1021 and an angle defined between the central axis of the second infrared sensor 1022 and the central axis of the third infrared sensor 1023 may be understood as a value obtained by subtracting the angle θ2 from 90 degrees.

As a result, the second infrared sensor 1022 may detect an object passing through a zone corresponding to several meters in front toward the center of the road and several meters behind the integrated smart sensor device 100 directly below the integrated smart sensor device 100. In addition, the first infrared sensor 1021 may detect an object passing through the zone corresponding to the first lateral side of the zone detected by the second infrared sensor 1022, that is, left and left front zones of the integrated smart sensor device 100. In addition, the third infrared sensor 1023 may detect an object passing through the right and right front zones of the integrated smart sensor device 100.

Figure 8:
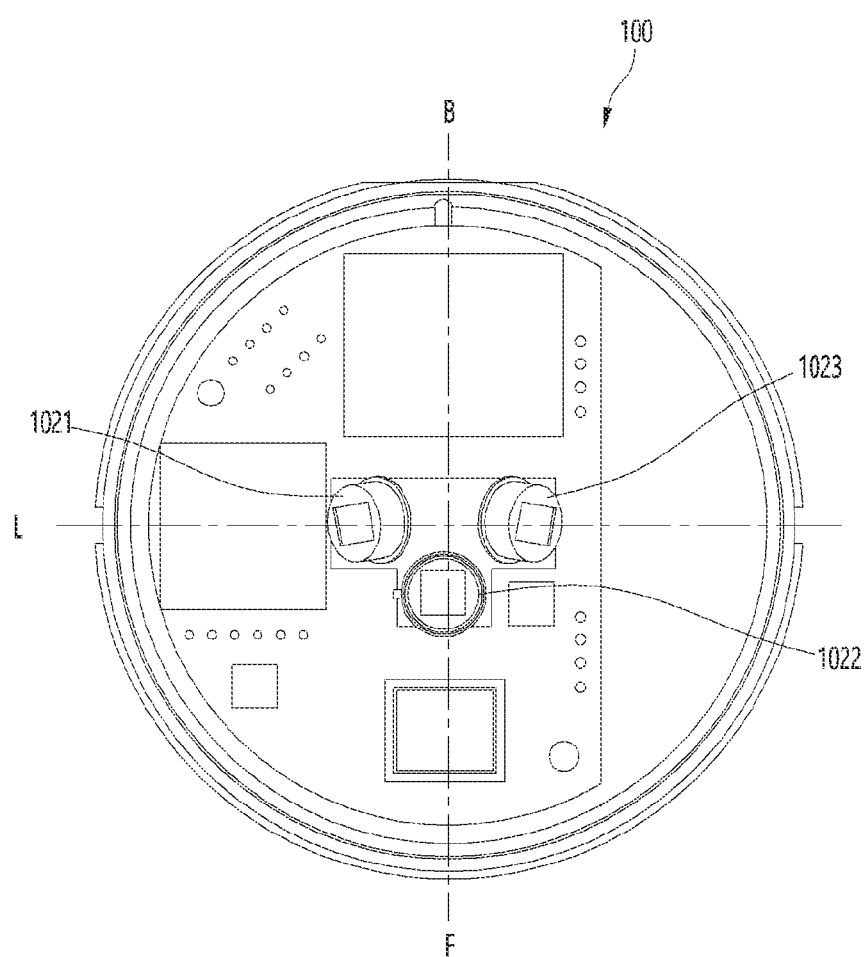
FIG. 8 is a plan view of the integrated smart sensor device.

FIG. 8 is a plan view of the integrated smart sensor device.

In detail, the drawing illustrated in FIG. 8 may be understood as a view when a user looks up at the integrated smart sensor device 100 while the integrated smart sensor device 100 is installed on the fixed arm 120.

In addition, the second infrared sensor 1022 faces a directly downward direction and a forward direction F. Thus, the second infrared sensor 1022 detects a zone that is directly below and behind B the smart sensor device 100. A rear zone refers to a zone covering a pedestrian road.

In addition, the first infrared sensor 1021 covers a left zone of the integrated smart sensor device 100 and a left front zone including the road. In addition, the third infrared sensor 1023 covers a right front zone including the right zone and the road of the integrated smart sensor device 100.

The first to third infrared sensors 1021 to 1023 may be multi-element sensors having at least two pyroelectric elements that detect infrared rays. Thus, the detection zone detected by the infrared sensor may be divided into a positive zone and a negative zone, and a plurality of positive zones and a negative zone may be alternatively disposed by the number of Fresnel lenses formed on the lens cover 190 and a pattern of Fresnel lens. This will be described in detail with reference to the accompanying drawings.

Figure 9:
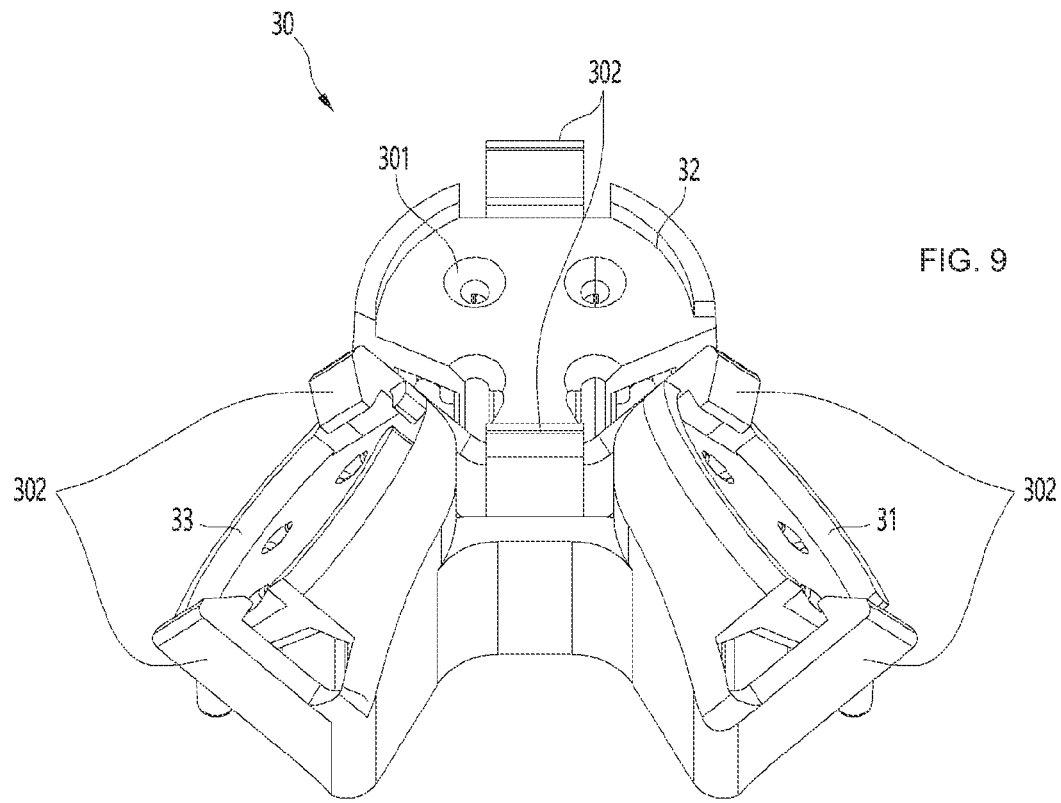
FIGS. 9 and 10 are perspective views of a sensor bracket for fixing an infrared sensor to a sensor substrate according to an embodiment of the present invention.
Figure 10:
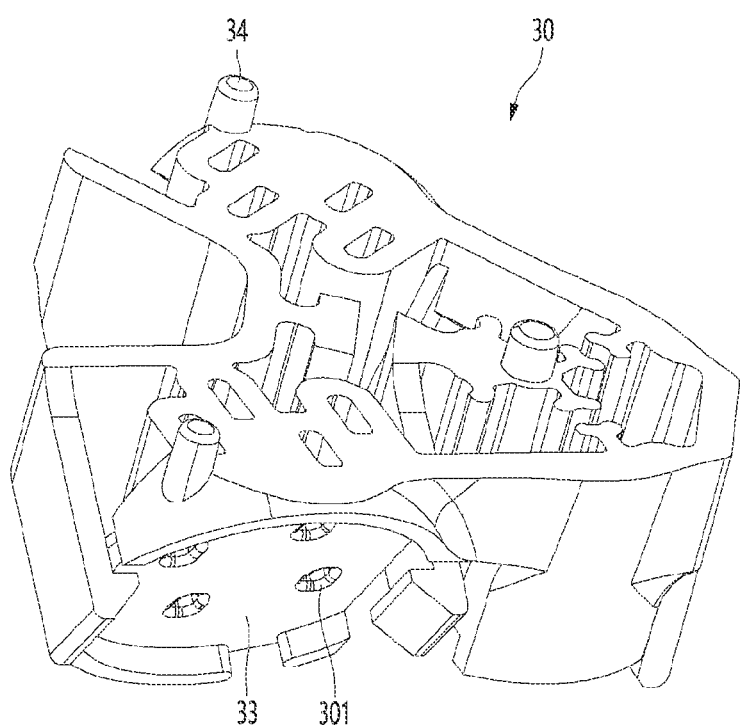

FIGS. 9 and 10 are perspective views of a sensor bracket for fixing the infrared sensor to the sensor substrate according to an embodiment of the present invention.

Referring to FIGS. 9 and 10, the sensor bracket 30 may include a first mounting part 31 to which the first infrared sensor 1021 is fixed, a second mounting part 32 to which the second infrared sensor 1022 is fixed, and a third mounting part 33 to which the third infrared sensor 1023 is fixed.

In detail, the second mounting part 32 may be disposed to be slightly inclined forward from the vertical plane, and each of the first and third mounting parts 31 and 33 may be inclined at a predetermined angle from the sensor substrate 160 corresponding to the horizontal plane and also be disposed to be inclined at a predetermined angle to each of left and right sides from the second mounting part 32.

In addition, one or more sensor fixing holes 301 may be defined in a surface on which the first to third infrared sensors are placed. The number of sensor fixing holes 301 may be set differently depending on the sensor mounting part. This is done for preventing incorrect assembly when the type or standard of the infrared sensor mounted in each sensor fixing hole is different. For example, if the first infrared sensor 1021 and the third infrared sensor 1023 are the same type of infrared sensor, and only the second infrared sensor 1022 is a different type or standard of infrared sensor, two sensor fixing holes 301 may be defined in the second mounting part 32, and three or four sensor fixing holes 301 may be defined in the first and third mounting parts 31 and 33.

In addition, a pair of fixing hooks 302 for fixing the sensors are provided on a side surface of each of the first to third mounting parts 31 to 33. The pair of fixing hooks 302 may be disposed in positions facing each other.

In addition, bracket fixing protrusions 34 may protrude from opposite sides of a seating surface on which the first to third infrared sensors 1021 to 1023 are disposed, respectively. In addition, the bracket fixing protrusions 34 may be inserted to pass through the sensor substrate 160.

Figure 11:
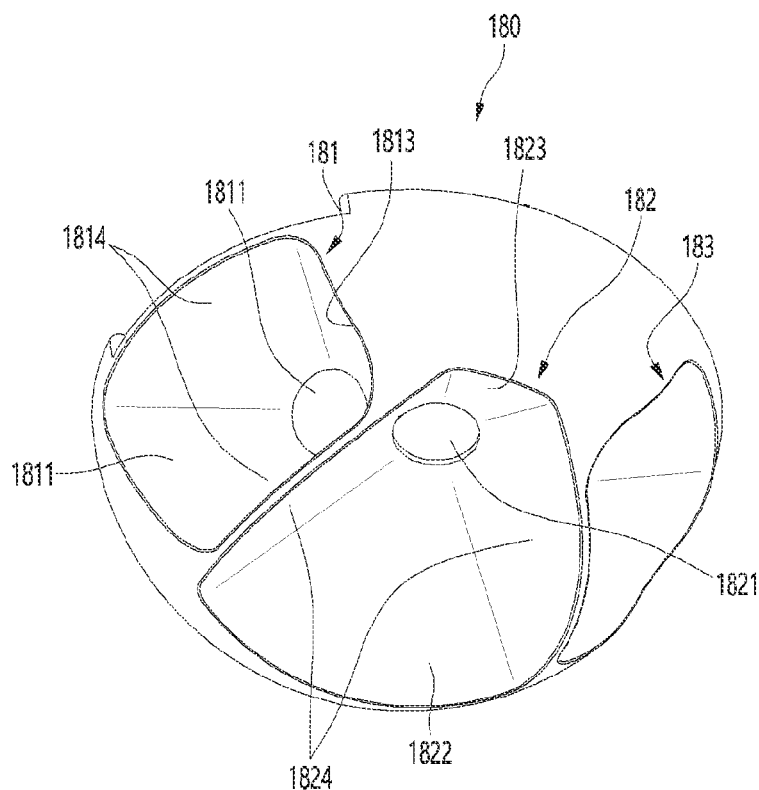
FIG. 11 is a left bottom perspective view of a divider constituting the integrated smart sensor device according to an embodiment of the present invention.
Figure 12:
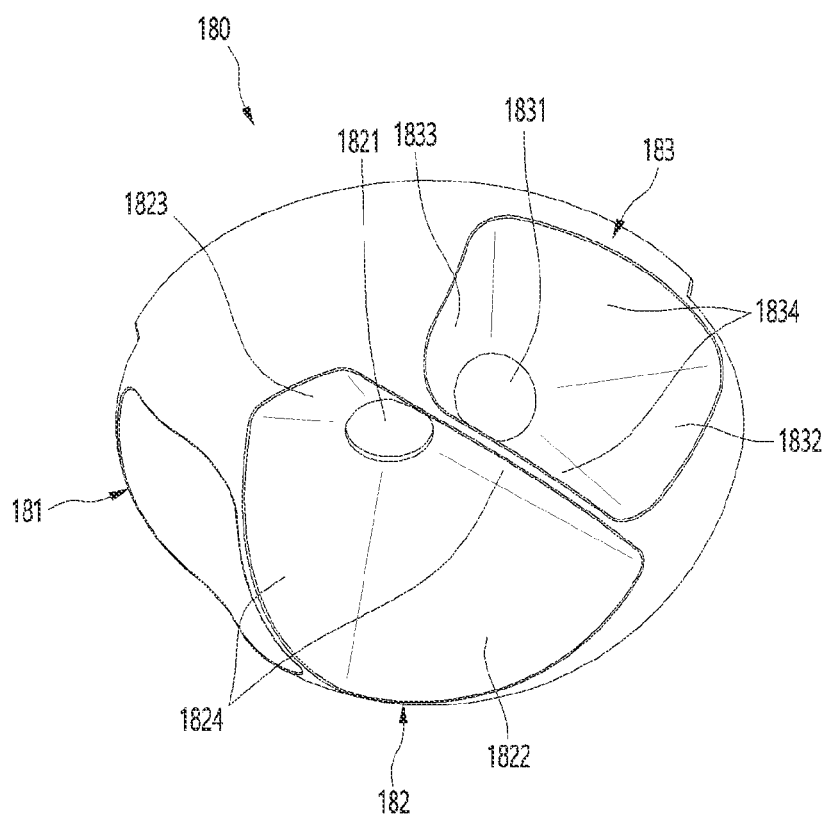
FIG. 12 is a right bottom perspective view of the divider.
Figure 13:
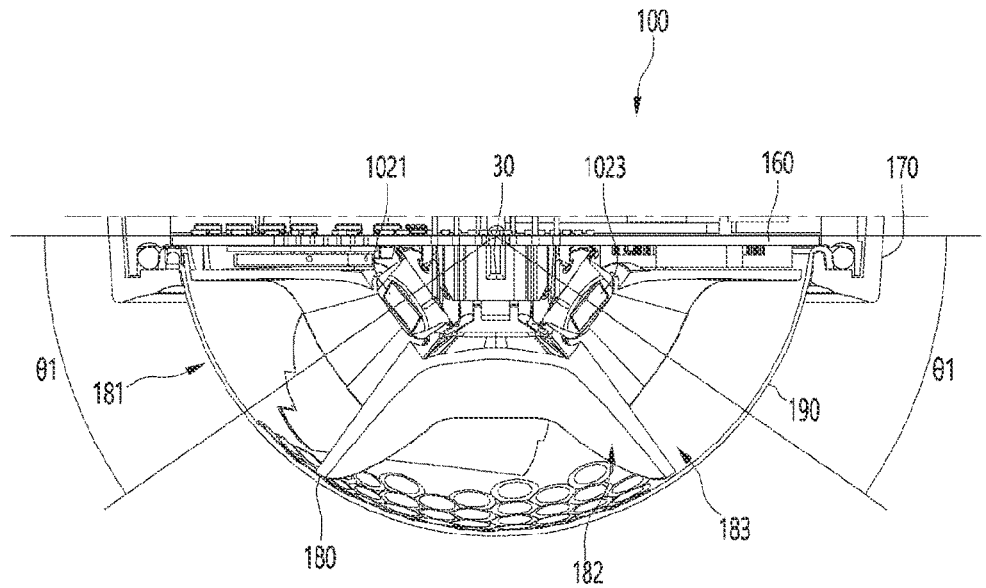
FIG. 13 is a partial longitudinal cross-sectional view of the smart sensor device.

FIG. 11 is a left bottom perspective view of a divider constituting the integrated smart sensor device according to an embodiment of the present invention, FIG. 12 is a right bottom perspective view of the divider, and FIG. 13 is a partial longitudinal cross-sectional view of the smart sensor device.

Referring to FIGS. 11 to 13, in the integrated smart sensor device 100 according to an embodiment of the present invention, in a state in which the integrated smart sensor device 100 is mounted on the fixed pole 110, a hemispherical lens cover 190 may be coupled to an inner edge of a lower end of the housing 170, and the divider 180 may be disposed at an upper side of the lens cover 190. In addition, the sensor substrate 160 on which the first to third infrared sensors 1021 to 1023 are mounted is disposed on the divider 180.

In detail, the divider 180 has a hemispherical shape similar to a shape of the lens cover 190. In the divider 180, a plurality of guide grooves are defined to be recessed from a spherical surface to a predetermined depth, and each of the plurality of guide grooves is recessed in such a manner that a width thereof is gradually narrowed as the recessed depth increases.

The plurality of guide grooves may include a first guide groove 181 that guides infrared rays emitted from an object passing through the first detection zone to be focused on the first infrared sensor 1021, a second guide groove 182 that guides infrared rays emitted from an object passing through the second detection area to be focused on the second infrared sensor 1022, and a third guide groove 183 that guides infrared rays emitted from an object passing through the third detection area to be focused on the third infrared sensor 1023.

In addition, a first sensor hole 1811 is defined in a bottom of the first guide groove 181, and an infrared receiving window of the first infrared sensor 1021, i.e., a polarizing filter is exposed through the first sensor hole 1811. A second sensor hole 1821 is defined in a bottom of the second guide groove 181, and an infrared receiving window of the second infrared sensor 1022 is exposed through the second sensor hole 1821. A third sensor hole 1831 is defined in a bottom of the third guide groove 183, and the infrared receiving window of the third infrared sensor 1023 is exposed through the third sensor hole 1831.

The first guide groove 181 and the third guide groove 183 are oriented at a predetermined angle to the left and right sides, respectively, with respect to the second guide groove 182. In addition, each of the first to third guide grooves 181 to 183 defines front surfaces 1812, 1822, and 1832, rear surfaces 1813, 1823, and 1833, and a pair of side surfaces 1814, 1824, and 1834.

The first to third guide grooves 181 to 183 are defined to be partitioned with respect to each other to prevent the adjacent infrared sensors from repeatedly detecting the same object and generating detection confusion or noise. For example, an object moving within the first detection zone is detected only by the first infrared sensor 181 and is not detected by the second infrared sensor 182 or the third infrared sensor 183.

Since the divider 180 is disposed between the infrared sensors 181 to 183 and the lens cover 190 to prevent the confusion in detection due to overlapping the detection zones, the plurality of sensors are disposed closely adjacent to each other, and thus, there is an advantage that the integrated smart sensor device 100 is designed in a compact size. As a result, manufacturing costs of the smart sensor device 100 may be reduced.

In addition, a spaced angle or opening angle between the adjacent sensors, which is set to prevent the detection confusion between the adjacent sensors, may be minimized, and thus, a blind spot generated between the adjacent detection zones, i.e., a zone that is not detected by the sensors may be minimized.

Figure 14:
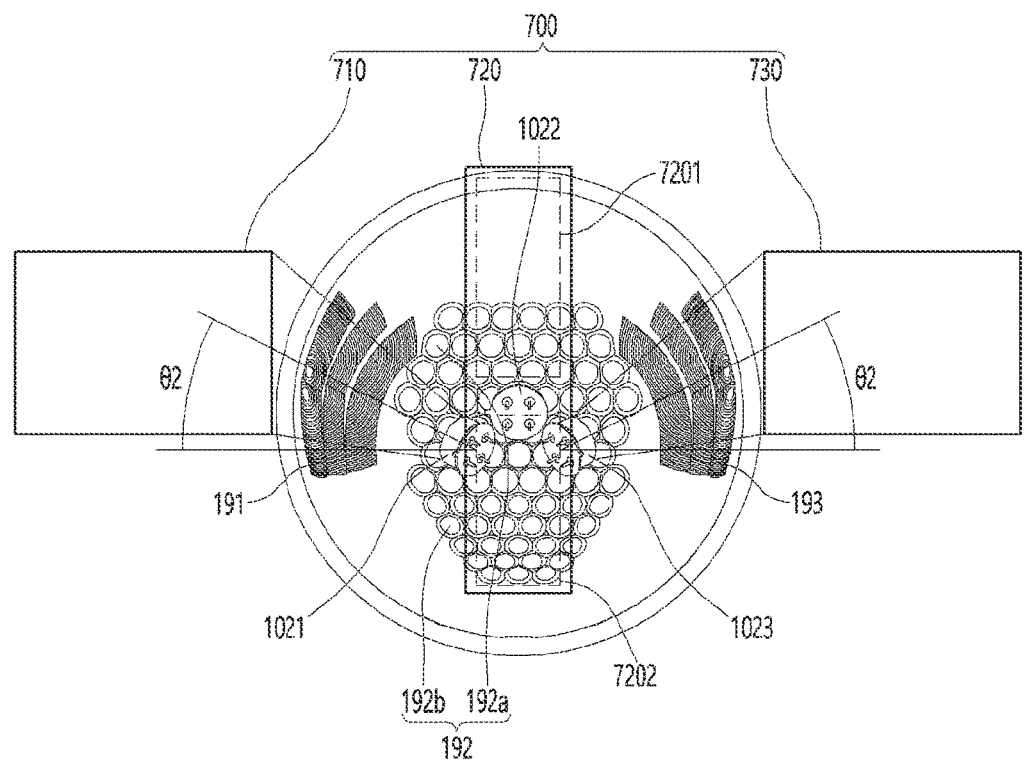
FIG. 14 is a bottom view of a lens cover provided in the integrated smart sensor device according to an embodiment of the present invention.
Figure 15:
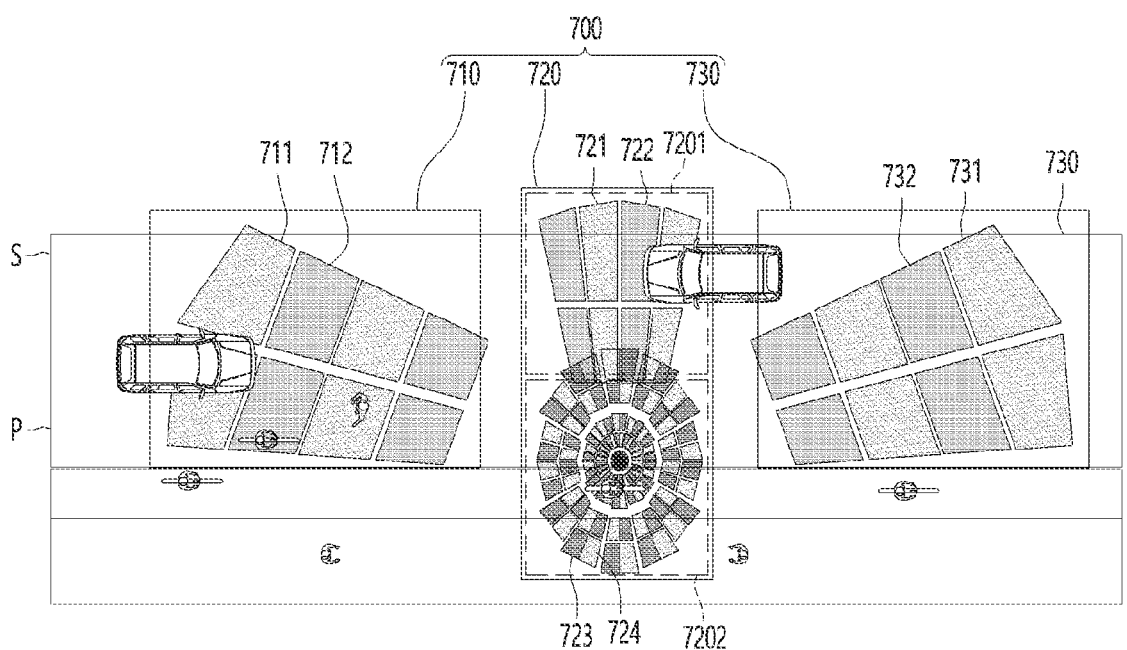
FIG. 15 is a view illustrating a detection zone that is detected by infrared sensors.

FIG. 14 is a bottom view of the lens cover provided in the integrated smart sensor device according to an embodiment of the present invention, and FIG. 15 is a view illustrating the detection zone that is detected by the infrared sensors.

Referring to FIGS. 14 and 15, the first to third sensors 1021 to 1023 include two or more pyroelectric elements and a FET element that amplifies an infrared signal received through the polarizing filter. In this embodiment, a double element sensor having the two pyroelectric elements will be described as an example.

In general, a Fresnel lens is provided in front of the sensor to increase in detection distance, detection range, and sensitivity of the infrared sensors. In the case of the present invention, different types of Fresnel lens arrays for each detection zone are provided on a rear surface of a rounded cover made of a hemispherical plastic material.

The Fresnel lens expands the detection distance of the infrared sensor, maximizes the sensitivity, and functions to block an influence of external wind as well as external miscellaneous light. In addition, a focus of the Fresnel lens array is designed to be formed on the polarizing filter of the infrared sensor.

In addition, in an infrared sensor structure having the two pyroelectric elements, the detection zone corresponding to one Fresnel lens is divided into a positive zone and a negative zone. Therefore, when the moving object moves in the detection zone, if infrared rays are incident on the pyroelectric element provided in the infrared sensor as the moving object sequentially passes through the positive and negative zones, a pyroelectric effect may appear in the pyroelectric element to detect a change in voltage, and thus, the infrared sensor detects a movement and speed of the object. The positive and negative zones may be defined as sub zones. Thus, it may be understood that sub zones corresponding to the number of Fresnel lenses constituting the Fresnel lens array are formed on a projection surface defined on the detection zone of the Fresnel lens array.

The plurality of Fresnel lens arrays having independent detection zones are provided on a rear surface of the lens cover 190 according to an embodiment of the present invention. The plurality of Fresnel lens arrays may be defined as an assembly of the plurality of Fresnel lenses, and different types of Fresnel lenses may be provided for the detection zones, respectively. The plurality of Fresnel lenses are disposed on the rear surface of the lens cover 190.

In detail, the plurality of Fresnel lens arrays may include a first lens array 191 that allows the infrared rays to be incident into the first infrared sensor 1021, a second lens array 192 that allows the infrared rays to incident into the second infrared sensor 1022, and a third lens array 193 that allows the infrared rays to be incident into the third infrared sensor 1023. In addition, the second lens array 192 may be divided into a front lens array 1921 and a lower lens array 1922.

The first lens array 191 is disposed at a left side of a point of the lens cover 190 corresponding to the infrared sensor assembly, specifically in front of the sensor bracket 30, the second lens array 192 is disposed at a center, and the third lens array 193 is disposed at a right side.

The first lens array 191 and the third lens array 193 may be provided in a symmetrical shape at symmetrical positions with respect to a line bisecting the lens cover 190. In addition, the shapes of the first and third lens arrays 191 and 193 may be designed to be different from the lens shape of the second lens array 192, and thus, the object detected by the first and third infrared sensors 1021 and 1023 and the object detected by the second infrared sensor 1022 may be set differently. For this, the second infrared sensor 1022 may have different specifications from those of the first and third infrared sensors 1021 and 1023.

Each of the first and third lens arrays 191 and 193 may have a structure in which the plurality of Fresnel lenses, each of which has an elongated and curved rectangular shape, are arranged in a radial direction of the lens cover 190 as illustrated in the drawings.

In addition, the second lens array 192 may have a dimple structure in which a plurality of circular Fresnel lenses are disposed to be adjacent to each other, and a diameter of the Fresnel lens constituting the front lens array 1921 and a spaced distance between the adjacent lenses may be designed to be different from a diameter of the Fresnel lens constituting the lower lens array 1922 and a spaced distance between the adjacent lenses.

For example, the size of the Fresnel lens constituting the front lens array 1922 and the spaced distance between the adjacent Fresnel lenses may be designed to be greater than the size of the Fresnel lens constituting the rear lens array 1922 and the spaced between the adjacent Fresnel lenses, and thus, the detection zone covered by the front lens array 192 may be expanded from the sidewalk toward the center of the road.

In addition, the formed position and number of the Fresnel lens array may be set according to the number of infrared sensors provided in the integrated smart sensor device 100 and a direction in which the polarizing filter of the infrared sensor is oriented.

In addition, in the integrated smart sensor device 100, a projection surface defined as the left detection zone 710 is provided on the left ground, a projection surface defined as the central detection zone 720 is provided on the central ground, and a projection surface defined as the right detection zone 710 is provided on the right ground. In addition, the central detection zone 720 may be divided into a projection surface defined as the front detection zone 7201 and a projection surface defined as the lower detection zone 7202.

In addition, the formation position and detection zone of the detection zones are determined by the formation positions of the lens arrays 191 to 193 and the size and shape of the Fresnel lens forming each lens array.

Specifically, the left detection zone 710 and the right detection zone 730 may be projected on a road S to detect movement of a bicycle or vehicle that moves at a relatively high speed, the front detection zone 7201 of the central detection zone 720 may be projected on the road S to detect movement of a vehicle, and the lower detection zone 7201 may be projected on a sidewalk P to detect movement of a walking person, a pet, or a bicycle that moves at a relatively slow speed.

As illustrated in FIG. 7, each detection zone may be divided into a plurality of division zones. The motion sensor 102 may determine the type of object based on a size and speed of the object when passing through each division zone. As described above, the plurality of division zones include a plurality of positive zones and a plurality of negative zones.

For example, a left detection zone 710 may be divided into a pattern on which a first division zone 711 (positive zone) and a second division zone 712 (negative zone) are repeated. In addition, the right detection zone 730 may be divided into a pattern on which a seventh division zone 731 (positive zone) and an eighth division zone 732 (negative zone) are repeated.

The central detection zone 720 may detect the road S and the sidewalk P (or bicycle path) at the same time and thus may include a division zone on which different patterns are repeated. For example, the front detection zone 7201 that detects the road S may be divided into a pattern on which a third division zone 721 (positive zone) and a fourth division zone 722 (negative zone) are repeated. In addition, the lower detection zone 7202 that detects the sidewalk P may be divided into a pattern on which a fifth division zone 723 (positive zone) and a sixth division zone 724 (negative zone) are repeated.

A size of each of the fifth division zone 723 and the sixth division zone 724, which are zones for detecting the sidewalk P (or bicycle path), may be less than that of each of the third division zone 721 and the fourth division zone 722 for detecting the road. In other words, the size of the division zone in the zone in which an object having a slow moving speed is detected is provided to be relatively small, and the size of the division zone in the zone in which an object having a fast moving speed is detected is provided to be relatively large. Thus, in the zone in which the sidewalk (or bicycle path) is detected, a smaller division zone may be provided because the people or bicycle travels at the slower speed than that of the vehicle traveling on the road.

The control unit 109 may acquire information on the types of objects that move based on movement information of the object detected on each detection zone corresponding to the first infrared sensor 1021, the second infrared sensor 1022, and the third infrared sensor 1023, which are defined by the motion sensor 102. The object movement information may include object size information and object speed information, and object types may be classified into vehicles, bicycles, people, and pets.

The control unit 107 may transmit the acquired object movement information and the object type information to the control server 200 through the communication unit 101.

Thus, the control server 200 may provide the information about the type, size, and speed of each object moving around the lighting device 130 to the control device 300.

According to the present invention, the divider 180 may be provided between the infrared sensors and the lens cover 190 to minimize a non-detection zone or blind spot generated between the left detection zone 710 (or the right detection zone 730) and the central detection zone 720. In addition, the objects that move at different speeds may be accurately detected due to the arrangement of the lens arrays 191 to 193 disposed on the lens cover 190 and the shape and size of the Fresnel lens constituting each lens array.

The above-described present invention may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices.

The invention claimed is:

1. An integrated smart sensor device, which is installed on one of a fixing pole standing on a ground or a bottom surface of a facility, a fixing arm laterally extending from the fixing pole, or a lighting device installed on the fixing arm, and in which a plurality of sensors are installed,
wherein the integrated smart sensor device comprises:
a base;
a main substrate which is disposed on one surface of the base and on which a plurality of electric components are mounted;
a sensor substrate disposed on one surface of the main substrate;
an infrared sensor assembly mounted on the sensor substrate and comprising a plurality of infrared sensors configured to detect movement of an object;
a housing coupled to an edge of the base to accommodate the main substrate and the sensor substrate;
a lens cover coupled to one side of the housing and having a hemispherical shape in which a plurality of lens arrays are provided; and
a hemispherical divider disposed between the lens cover and the infrared sensor assembly so that infrared rays passing through the plurality of lens arrays are divided and focused to the plurality of infrared sensors;
wherein the plurality of infrared sensors comprise:
a second infrared sensor;
a first infrared sensor disposed at a left side of the second infrared sensor; and
a third infrared sensor disposed at a right side of the second infrared sensor,
a vertical surface extending along an edge of a road is defined as a first vertical surface,
a vertical surface passing through the second infrared sensor and orthogonal to the first vertical surface is defined as a second vertical surface,
a direction that is oriented from the edge of the rod in a central direction is defined as a front direction,
a zone on which the object is detected by the second infrared sensor and which is divided by the second vertical surface is defined as a central detection zone,
a zone on which the object is detected by the first infrared sensor and which is spaced apart from the central detection zone to a left side at a predetermined angle and is defined between the central detection zone and the first vertical surface is defined as a left detection zone,
a zone on which the object is detected by the third infrared sensor and which is spaced apart from the central detection zone to a right side at a predetermined angle and is defined between the central detection zone and the first vertical surface is defined as a right detection zone, and
detection surfaces of the first to third infrared sensors are installed to be oriented in different directions so that the left detection zone, the central detection zone, and the right detection zone are detected by the first to third infrared sensors, respectively, and
wherein the divider comprises:
a first guide groove configured to guide the infrared rays emitted from the object disposed on the left detection zone to be focused to the first infrared sensor;
a second guide groove configured to guide the infrared rays emitted from the object disposed on the central detection zone to be focused to the second infrared sensor; and
a third guide groove configured to guide the infrared rays emitted from the object disposed on the right detection zone to be focused to the third infrared sensor,
wherein the first to third guide grooves are disposed to be spaced apart from each other in a circumferential direction to the divider.

2. The integrated smart sensor device according to claim 1, wherein the plurality of infrared sensors comprise:
wherein a line connecting centers of the first to third infrared sensors has a triangular shape, and each of the first to third infrared sensors is a passive infrared sensor.

3. The integrated smart sensor device according to claim 1, wherein the central detection zone comprises:
a front detection zone defined in front of the first vertical surface and
a rear detection zone defined behind the front detection zone.

4. The integrated smart sensor device according to claim 3, wherein the detection surface of the second infrared sensor is oriented in a direction that is inclined at a predetermined angle directly downward and/or in front of the first vertical surface.

5. The integrated smart sensor device according to claim 4, wherein the detection surface of the first infrared sensor is inclined at a predetermined angle (θ1) downward from the vertical surface passing through the sensor substrate to face the left detection zone and is inclined at a predetermined angle (θ2) from the first vertical surface toward the second vertical surface.

6. The integrated smart sensor device according to claim 5, wherein the detection surface of the third infrared sensor is inclined at a predetermined angle (θ1) downward from the vertical surface passing through the sensor substrate to face the right detection zone and is inclined at a predetermined angle (θ2) from the first vertical surface toward the second vertical surface.

7. The integrated smart sensor device according to claim 1, wherein a first sensor hole in which the detection surface of the first infrared sensor is disposed is defined in a bottom of the first guide groove,
a second sensor hole in which the detection surface of the second infrared sensor is disposed is defined in a bottom of the second guide groove,
a third sensor hole in which the detection surface of the third infrared sensor is disposed is defined in a bottom of the third guide groove, and
each of the first to third guide grooves is recessed in a shape of which a width is gradually narrowed from an outer circumferential surface of the divider to the sensor hole.

8. The integrated smart sensor device according to claim 7, wherein a plurality of lens arrays are disposed on a rear surface of the lens cover, and
each of the plurality of lens arrays is provided as an assembly of patterns of a plurality of Fresnel lenses.

9. The integrated smart sensor device according to claim 8, wherein the plurality of lens arrays comprise:
a first lens array configured to focus the infrared rays emitted from the object disposed on the left detection zone to the first infrared sensor;
a second lens array configured to focus the infrared rays emitted from the object disposed on the central detection zone to the second infrared sensor; and
a third lens array configured to focus the infrared rays emitted from the object disposed on the right detection zone to the third infrared sensor.

10. The integrated smart sensor device according to claim 9, wherein the patterns of the Fresnel lenses constituting the first and third lens arrays are the same, and
the Fresnel lens constituting the second lens array has the pattern different from each of the patterns of the Fresnel lenses constituting the first and third lens arrays.

11. The integrated smart sensor device according to claim 10, wherein the second lens array is an assembly of circular Fresnel lenses, and the first and third lens arrays are provided in a symmetrical shape with respect to the second lens array and are an assembly of Fresnel lenses extending in a rectangular shape.

12. The integrated smart sensor device according to claim 11, wherein the second lens array comprises:
a front lens array configured to focus the infrared rays emitted from the object disposed on the front detection zone to the second infrared sensor; and
a lower lens array configured to focus the infrared rays emitted from the object disposed on the lower detection zone to the second infrared sensor,
wherein a diameter of the Fresnel lens constituting the front lens array is greater than that of the Fresnel lens constituting the lower lens array.

13. The integrated smart sensor device according to claim 1, further comprising a sensor bracket configured to support the first to third infrared sensors,
wherein the sensor bracket comprises:
a first mounting part on which a seating surface of the first infrared sensor is defined;
a second mounting part on which a seating surface of the second infrared sensor is defined; and
a third mounting part on which a seating surface of the third infrared sensor is defined,
wherein one or a plurality of bracket fixing protrusions protrude from a bottom surface of the sensor bracket.

14. The integrated smart sensor device according to claim 13, wherein a pair of sensor fixing hooks extend from an edge of each of the seating surfaces of the first to third mounting parts,
a sensor fixing hole is defined in each of the seating surfaces, and
the number of sensor fixing holes are different for each mounting part.

15. The integrated smart sensor device according to claim 1, wherein the plurality of sensors further comprise at least one of:
a noise sensor configured to detect surrounding noise so as to generate noise information;
a positioning sensor configured to generate positioning information related to an installed position of the fixing pole;
an optical sensor configured to detect surrounding luminous flux, luminance, or illuminance so as to generate optical detection information; or
a vibration sensor configured to detect an inclination or vibration of the fixing pole or the lighting device so as to generate inclination information or vibration information.

16. The integrated smart sensor device according to claim 15, further comprising:
a communication unit configured to perform communication with at least one control server; and
a control unit configured to acquire object type information based on object movement information so as to transmit the object movement information and the object type information to the control server through the communication unit.

17. The integrated smart sensor device according to claim 16, wherein the control unit is configured to transmit at least one of the noise information, the positioning information, the optical detection information, the inclination information, or the vibration information to the at least one control server through the communication unit.

18. The integrated smart sensor device according to claim 17, wherein the integrated smart sensor device is controlled in operation according to a control command transmitted from a control interface to the control unit, and
the control interface is provided in a control device that communicates with the control server in a wired or wireless manner.

* * * * *